Oct. 11, 1932.  L. J. KLINE  1,881,676
TRAILER OR TRUCK LOCK MECHANISM
Filed Jan. 11, 1930   2 Sheets-Sheet 1
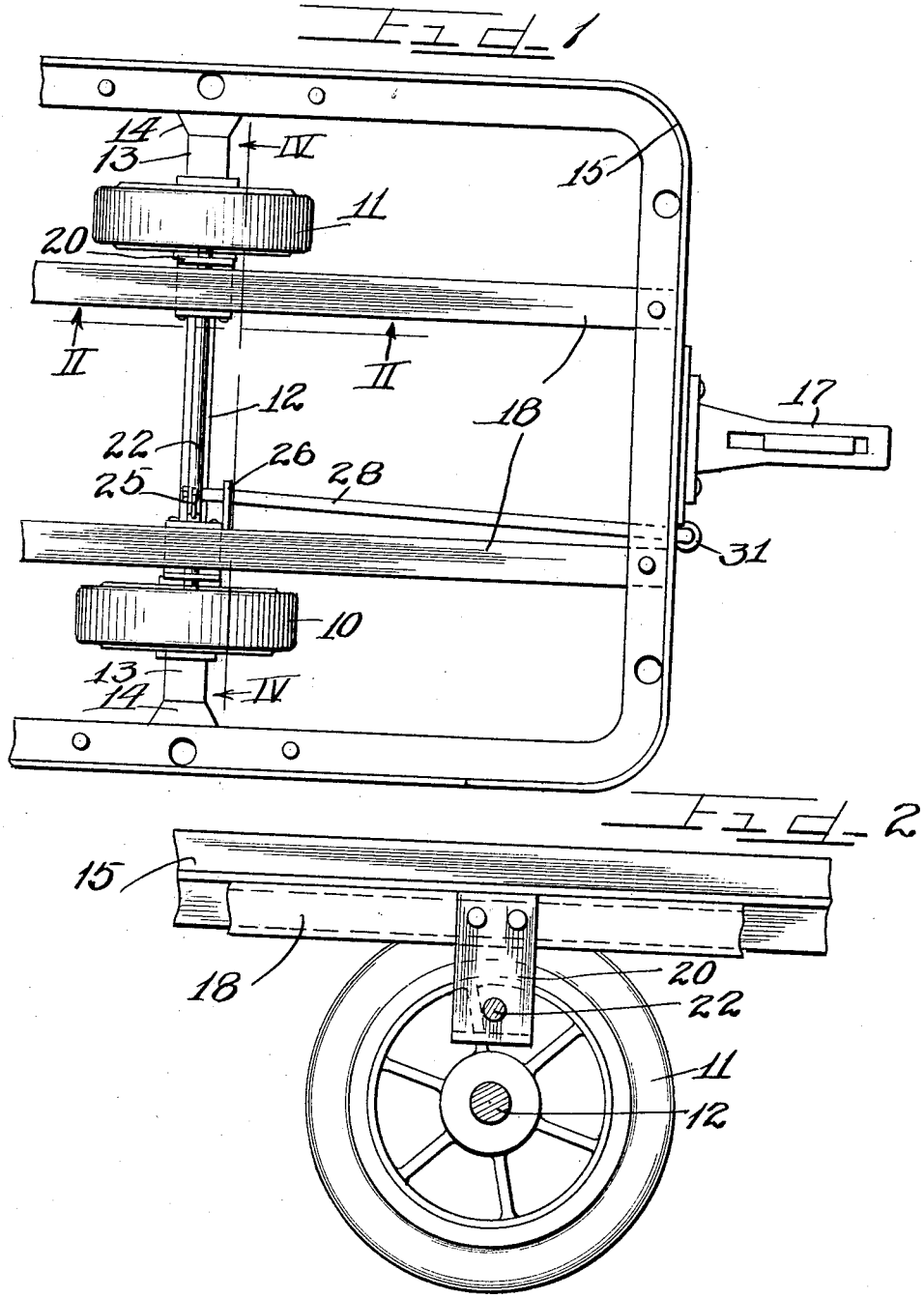
Inventor
Lawrence J. Kline
by Charles W. Polly
Attys.

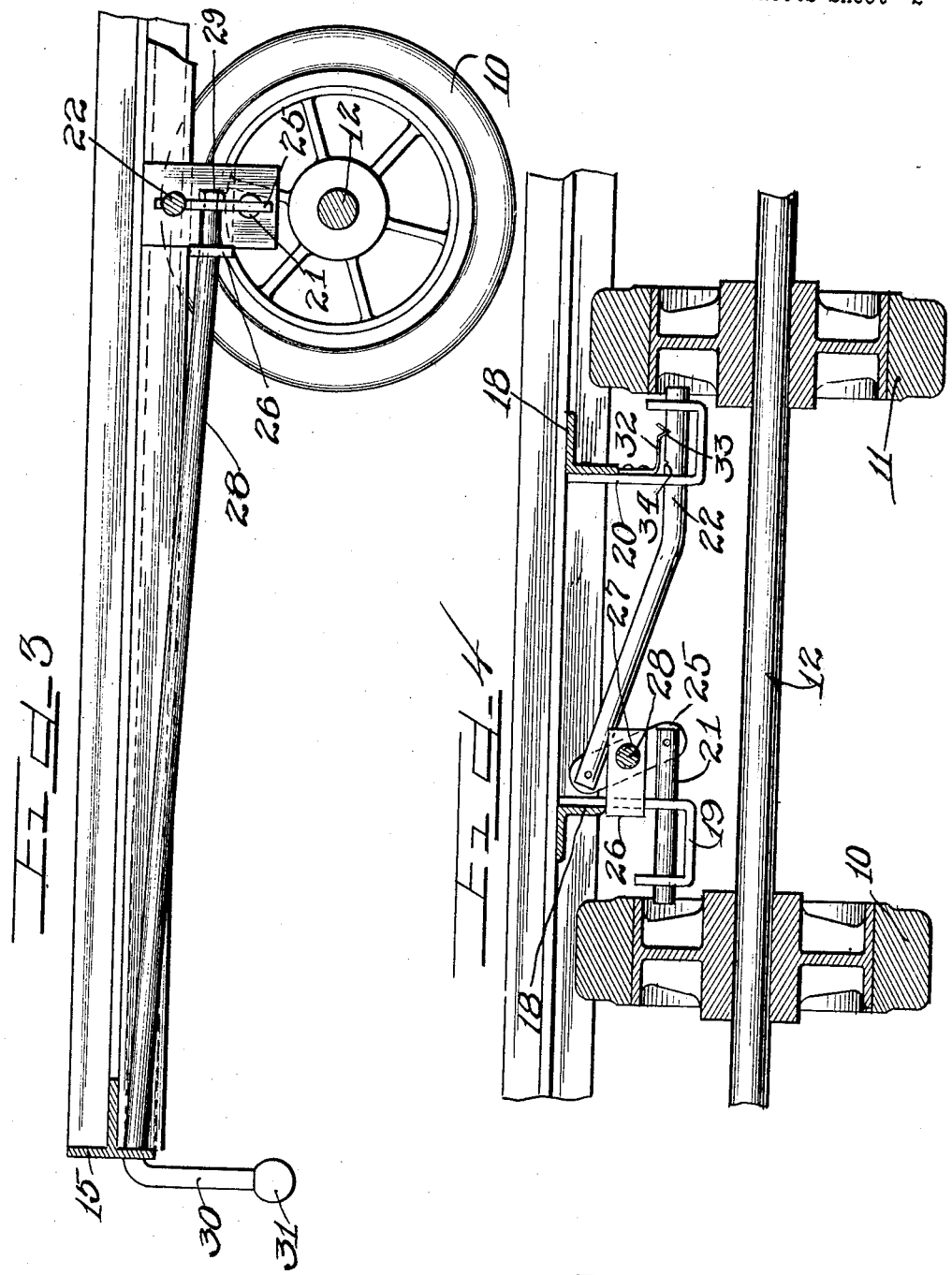

Patented Oct. 11, 1932

1,881,676

UNITED STATES PATENT OFFICE

LAWRENCE J. KLINE, OF CHICAGO, ILLINOIS, ASSIGNOR TO MERCURY MANUFACTURING COMPANY, OF CHICAGO, ILLINOIS, A CORPORATION OF ILLINOIS

TRAILER OR TRUCK LOCK MECHANISM

Application filed January 11, 1930. Serial No. 420,054.

This invention relates to a locking mechanism, and more particularly, its object is to provide a lock mechanism for industrial vehicles such as trailers and the like.

Heretofore, industrial trucks, trailers and the like have not been provided with the locking mechanism. It frequently occurs that vehicles of this character when left on a grade unattended, roll away and damage objects with which they may come in contact or upset and damage the load that they carry.

Another objection to the present non-locking industrial vehicle of this character is that the vehicles move about during the loading and unloading operations, sometimes causing the material being placed thereon or removed therefrom to slip off the vehicle and injure the user, thus causing considerable pain and annoyance to the employee and loss of service and expense to the employer.

In numerous instances, it has been observed that the user of this type of vehicle will frequently wedge a block of material against the periphery of the wheels for preventing the truck from moving. This is a crude method which has proven very unsatisfactory for maintaining the truck stationary during the loading and unloading operation.

In order to overcome these and other objections well known to those skilled in the art, a locking mechanism embodying the present invention was created.

In the present invention, a truck or a trailer and the like is provided with a locking mechanism comprising a plurality of slidable locking rods positioned parallel to the axle of the truck for engaging the inner sides of the rear wheels of the vehicle. These rods are actuated by an interconnected lever rod and its associated parts from a handle member connected thereto, and which handle is mounted on the front frame of the vehicle.

The actuation of the lever rod upwardly slidably moves the locking rod outwardly for engaging the spokes of the wheel of the trunk, and thereby preventing substantial rotatable movement of the same. The wheels are released from their locked position by reversing the movement of the locking rod.

Other and further important objects of this invention will be apparent from the disclosures in the drawings and specification.

This invention (in a preferred form thereof) is illustrated in the accompanying drawings and hereinafter more fully described.

On the drawings:

Figure 1 is a fragmentary plan view of a trailer embodying features of this invention.

Figure 2 is an enlarged fragmentary side elevational view taken on the line II—II of Figure 1, looking in the direction indicated by the arrows.

Figure 3 is a fragmentary side elevation partly in section drawn to an enlarged scale illustrating the lock mechanism embodied in this invention applied to a trailer.

Figure 4 is a fragmentary elevation partly in section drawn to an enlarged scale and taken substantially on the line IV—IV of Figure 1, looking in the direction indicated by the arrows.

As shown on the drawings:

In the trailer selected as the industrial type of vehicle to illustrate an embodiment of the present invention, there are the conventional type of spoke wheels 10 and 11 which are journalled on a suitable shaft 12.

While the lock mechanism of this invention is illustrated as attached to the conventional type of industrial trailer, it is to be understood that this lock mechanism may be used on any of the other industrial types of vehicles having two or more wheels, such as trucks and the like.

Mounted on the ends of the shaft 12 (Figure 1) are the usual bearing members 13 and 14 for supporting a trailer frame 15. Attached to the front part of the frame is a conventional type of coupling mechanism 17 for connecting the trailer to a tractor or the like.

Spaced equidistantly apart and having their ends secured to the front and rear portion of the frame are two angle members 18, each of which carries a bracket member 19 and 20. The brackets 19 and 20 are each provided with an integral U-shaped lower portion having apertures for receiving and supporting slidably movable locking rods 21 and 22.

The rod 22 which is longer than the rod 21 has its inner portion inclined upwardly and extending beyond the inner end of the rod 21. The inner end of the rod 22 is bifurcated for pivotally receiving an end portion of a link 25 connected thereto. The other end of the link 25 is pivotally connected to the bifurcated inner end of the rod 21.

A bracket 26 secured to the bracket 19 extends inwardly parallel to and above the rod 21. The bracket 26 is provided with an aperture 27 for receiving an end portion of a pivotal rod 28. The inner end of the rod 28 is provided with a smaller end portion that extends through an apertured portion of the link 25 and is rigidly secured thereto by means of a nut 29. The rod 28 inclines upwardly and has its outer end portion extending through an aperture in the frame 15. The outer end of the rod 28 is formed with an integral downwardly extending member 30 having an enlarged ball end portion 31 for providing a hand gripping place for pivotally actuating the rod 28.

A resilient L-shaped member 32 having its upwardly extending leg secured to the bracket 20 is best illustrated in Figure 4. The horizontal leg of the bracket is provided with a V-shaped end portion for engaging either of the grooves 33—34 of the rod 22 for normally maintaining the rod either in operative or inoperative position.

The operation of this lock mechanism is briefly as follows:

Normally when the trailer is in its inoperative position, the lock mechanism is in the position illustrated in Figures 3 and 4. When it is desired to lock the trailer, the manipulation of handle member 30 upwardly will pivotally move the rod 28 and the link 25 connected thereto, slidably actuating the rods 21 and 22 outwardly so that the outer ends of the rods will engage the rib or spoke portions of the wheels 10 and 11 respectively, thereby locking and preventing substantial rotatable movement of the wheels 10 and 11.

When the outer ends of the rod 21 and 22 are engaged with the rib portions of the wheels 10 and 11, the V-shaped end of resilient member 32 is in contact with the slot 34 of the rod 22 to normally maintain the rod in its locked position.

Whenever it is desired to unlock the trailer from its locked position, the downward movement of the handle member 30 will pivotally move the rod 28 in the opposite direction for slidably actuating the rods 21 and 22 inwardly to the position as disclosed in Figure 4. In this position, the V-shaped end of the resilient member 32 will engage the groove 33 of rod 22 for normally maintaining the rod in its unlocked position.

It can readily be seen that I have provided a novel lock mechanism for industrial vehicles such as trucks, trailers and the like, that is simple and inexpensive to manufacture, and which eliminates the crude method of blocking the wheels of a trailer and the like, for preventing the vehicle from moving.

Another advantage of the present invention is that the number of the accidents caused by trailers etc. moving about during the loading or unloading operation will be greatly reduced. It is obvious that I have provided a vehicle which is safer and easier to handle and which eliminates the objections to the present non-locking industrial vehicle.

Now, of course, it is to be understood that, although the invention is illustrated and described in detail in the preferred embodiment thereof, the invention is not to be thus limited, but only insofar as defined by the scope and spirit of the appended claims.

I claim as my invention:

1. In an industrial vehicle including a plurality of wheels, a frame carried by said wheels, a plurality of movable members for locking said wheels for preventing rotational movement thereof, means secured to said frame for supporting said members, detent means on said last mentioned means for latching said members in locked position and means operable from the front of said vehicle for actuating said members.

2. In a vehicle of the character described including a plurality of wheels, a frame supported by said wheels, brackets mounted on said frame, a plurality of members slidably disposed in said brackets, a link pivotally connected to one end of each of said members, and a member pivotally carried by one of said brackets and connected to said link for actuating said first members to lock said wheels against rotational movement, and a resilient member on the other of said brackets for engaging one of said first said mentioned members for maintaining the same in locked position.

3. In a vehicle of the character described including a plurality of wheels, a frame structure, a plurality of members mounted for reciprocable movement in said frame, each of said members being mounted contiguous one of said wheels, means for actuating said members to positions for locking and unlocking said wheels, a plurality of transverse grooves in one of said members, and a member arranged for movement into one of said grooves when said members are in the locking or unlocking positions, whereby all of said members are latched against movement.

In testimony whereof I have hereunto subscribed my name at Chicago, Cook County, Illinois.

LAWRENCE J. KLINE.